United States Patent [19]

Andersson

[11] 4,452,568
[45] Jun. 5, 1984

[54] MEANS FOR LIMITING ROTATION SPEED OF A VERTICAL SHAFT WIND TURBINE

[75] Inventor: Birger A. V. Andersson, Linköping, Sweden

[73] Assignee: Saab-Scania Aktiebolag, Linköping, Sweden

[21] Appl. No.: 456,038

[22] PCT Filed: May 11, 1982

[86] PCT No.: PCT/SE82/00162
§ 371 Date: Dec. 16, 1982
§ 102(e) Date: Dec. 16, 1982

[87] PCT Pub. No.: WO82/04103
PCT Pub. Date: Nov. 25, 1982

[30] Foreign Application Priority Data

May 15, 1981 [SE] Sweden .................. 8103054

[51] Int. Cl.³ .............................................. F03D 7/06
[52] U.S. Cl. .................... 416/119; 416/139; 416/132 B
[58] Field of Search .............. 416/119, 139 A, 140 R, 416/132 B

[56] References Cited

U.S. PATENT DOCUMENTS

| | | | |
|---|---|---|---|
| 1,582,361 | 4/1926 | Welsch | 416/132 B |
| 3,877,836 | 4/1975 | Tompkins | 416/111 X |
| 4,052,134 | 10/1977 | Rumsey | 416/119 |
| 4,180,367 | 12/1979 | Drees | 416/119 |
| 4,274,809 | 6/1981 | Delgado et al. | 416/132 B |
| 4,299,537 | 11/1981 | Evans | 416/119 |
| 4,334,823 | 6/1982 | Sharp | 416/139 A X |
| 4,368,392 | 1/1983 | Drees | 416/119 X |

FOREIGN PATENT DOCUMENTS

| | | | |
|---|---|---|---|
| 1045038 | 12/1978 | Canada | 416/119 |
| 2745862 | 4/1979 | Fed. Rep. of Germany | 416/119 |
| 2481756 | 11/1981 | France | 416/112 |

Primary Examiner—Everette A. Powell, Jr.
Attorney, Agent, or Firm—James E. Nilles; James R. Custin

[57] ABSTRACT

Means for limiting rotational speed in a vertical shaft wind turbine (1) having a central hub (3) and spokes (4) extending therefrom. Spokes lying over each other support at their ends turbine blades (6) placed concentrically around the turbine shaft. Each turbine blade (6) is pivotable around a vertical axle (CA), and a leaf spring bundle (10) is in each spoke placed between the turbine blade and the base of the spoke in order to adjust, when the turbine is at a rest, the turbine blade chord angle ($\beta$) in to a predetermined position and taking an unloaded state in which its center of gravity (CG) is located near and, as seen in the direction of rotation of the tubine, behind a plane (15) through the symmetry axis (CB) of the turbine shaft and the pivot axle (CA) of the turbine blade. The pivot axle (CA) of the turbine blade has such a position that the torque of the wind forces (P) around the pivot axle is reduced to a minimum. The spring bundle (10) is dimensioned to exert a great resistance to deflection when the turbine rotates at operation speed, the chord angle of the turbine blade thereby remaining essentially unchanged, and in order to deflect gradually and faster and faster at higher rotation speeds beyond operation speed resulting in a readjustment of the turbine blade (6) in a direction for limiting the rotation speed.

7 Claims, 5 Drawing Figures 4,452,568

MEANS FOR LIMITING ROTATION SPEED OF A VERTICAL SHAFT WIND TURBINE

TECHNICAL FIELD

The present invention relates to means for limiting rotation speed of a wind turbine which has a number of turbine blades concentrically located relative to a turbine shaft, each turbine blade being connected by spokes to a turbine hub of the journalled turbine shaft.

BACKGROUND ART

Vertical shaft wind turbines of this kind are previously known. However, if they are designed to deliver a large amount of power they become relatively fragile and so they are not suitable to be placed without supervision. On the other hand, if they are made robust to be able to be left without supervision their economic yield will become small.

In order to facilitate location without any supervision it is required for a wind turbine, besides control of rotation speed, e.g. when wind turbines drive an electrical generator, that the rotation speed of the wind turbine must be able to be limited upwards in order to prevent overspeeding at high wind forces, particularly when the turbine is unloaded, since then the turbine can be subjected to too high destructive centrifugal forces.

The limitation of rotation speed can take place by mechanical braking. A more sophisticated way to achieve limitation of rotation speed is to provide readjustment of the turbine blades for reducing the driving torque of the turbine. Thus, it is previously known in horizontal shaft turbines to provide, under influence of the centrifugal force and/or the wind force acting on a turbine blade, readjustment of the turbine blade in dependence upon the rotation speed of the turbine.

A proposal for a vertical shaft wind turbine having this function has been made by P. J. Musgrave in Proceedings of the International Symposium on Wind Energy Systems in Cambridge, Sept. 7-9, 1976. In this wind turbine the vertical turbine blades are unsymmetrically suspended in their longitudinal direction each on one single spoke. This suspension comprises a horizontal shaft which permits the turbine blades to pivot under influence of the centrifugal force acting on the turbine blades during rotation of the turbine. When the rotation speed increases, the turbine blades will pivot from a vertical position towards a horizontal position, with the result that the drive torque on the turbine emanating from the wind forces will be reduced, and in consequence the rotation speed will be limited.

However, in this wind turbine each turbine blade is supported in a single point of suspension which leads to great demands on the hinge construction. The hinge is permanently subjected to a varying load in response to the wind forces varying during the course of revolution. Moreover, the wind force often varies. In consequence of the continuously varying wind forces acting on the turbin blades there is a great risk for fatigue in the suspension hinge. Therefore this wind turbine is not suitable for location without any supervision. The construction for limiting rotation speed also does not facilitate aerodynamic braking of the turbine which is required if a start turbine, e.g. of the Savonius type, is employed.

Moreover, Mc Donnel Aircraft Company in a report by Robert V. Brulle in "Vertical-axis Wind Turbine Technology Workshop", May 17-20, 1976 has described a vertical shaft wind turbine, Giromill, having a robust construction where each turbine blade is supported by a least two spokes lying over each other. The turbine blades are individually readjustable around vertical shafts for bringing about an optimal angle of attack in each position of the turbine revolution, said readjustment being obtained by means of push rods, which abut a cam profile on the turbine shaft. However, no mechanism for the limitation of the rotation speed has been disclosed.

DISCLOSURE OF THE INVENTION

The object of the invention is to achieve in a wind turbine of the kind mentioned by way of introduction a reliable turbine blade readjustment means which limits the rotation speed of the turbine by automatic aerodynamic braking, resulting in a turbine which is dependable in service and can be left without surveillance.

According to the invention this object is achieved by means of at least one leaf spring provided between each turbine blade and the turbine frame, said spring being arranged to achieve at the rotation of the turbine, in response to a centrifugal force emanating from the mass of the leaf spring at rotation speeds beyond operation rotation speed, a rapidly increasing torque acting around the pivot axis of the turbine blade for readjustment the turbine blade in a direction for of limiting rotation speed and under action of deflection of the leaf spring.

BRIEF DESCRIPTION OF THE DRAWINGS

The invention is described in more detail below in respect of a preferred embodiment and with reference to the enclosed drawings.

MODE OF CARRYING OUT THE INVENTION AND INDUSTRIAL APPLICABILITY.

Figure 1:
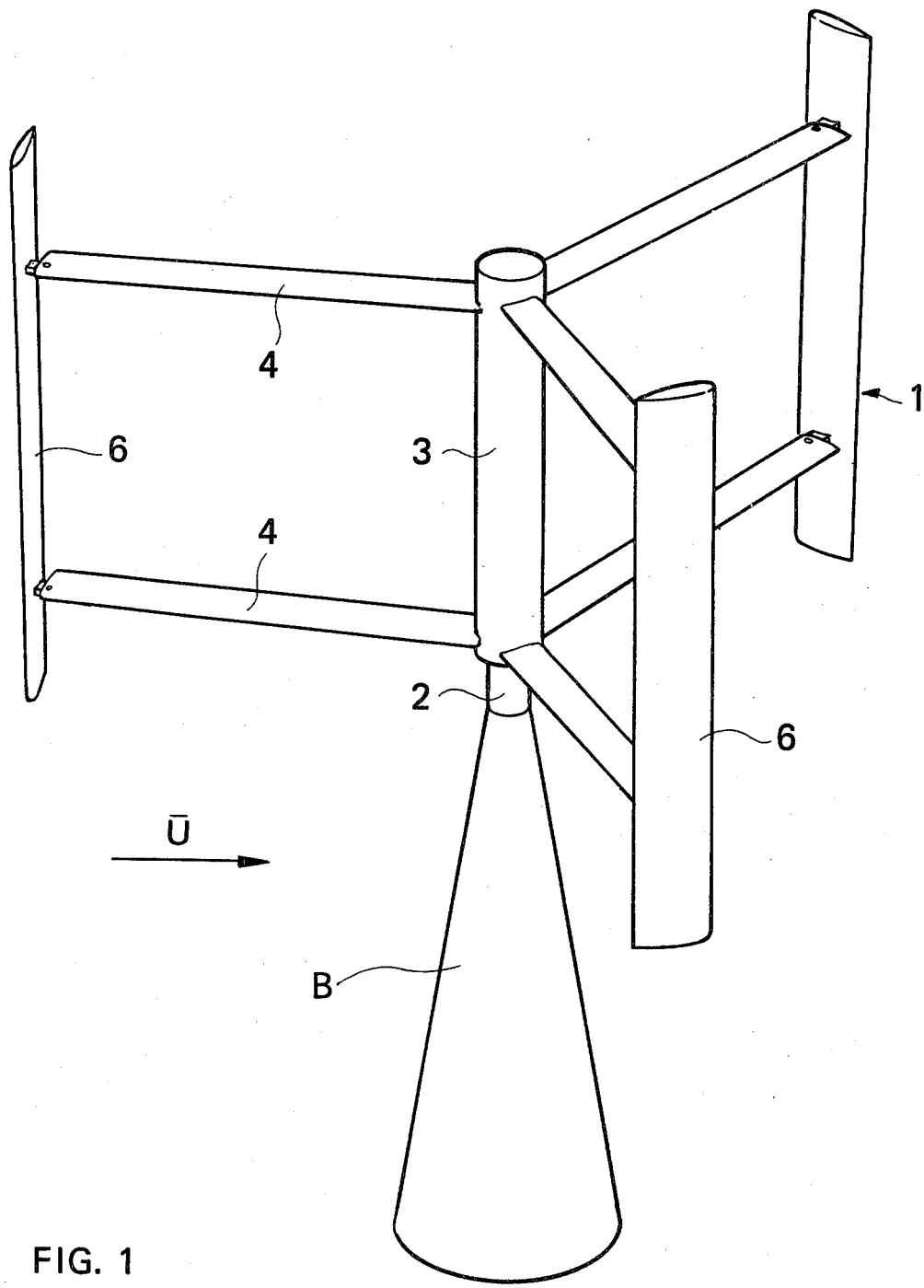
FIG. 1 is a perspective view of the entire wind turbine.

In FIG. 1 numeral 1 designates a vertical shaft wind turbine, which is blown on from the left by a wind which is illustrated by means of a vector $\bar{U}$. The turbine has a base B, here shown as a conical tower although any other sturdy base can be used. A vertical turbine shaft 2 extends through the top of the tower and is journalled in bearings therein.

The shaft 2 terminates in a hub 3 of some length and from which three pairs of radially orientated equally long, tubular spokes 4 extend. The hub 3 and the spokes 4 form a turbine stand or frame. The three pairs of spokes are firmly connected to the hub and are equally distributed around the hub. The spokes in each pair are located one over the other and are separated in the vertical direction. Each pair of spokes supports a vertically extending turbine blade 6 of some length and having an aerodynamically, preferably symmetrically shaped profile. The turbine blade extends somewhat beyond the spokes in the vertical direction and is made of preferably straight, hollow profiles as shown on the drawing.

Each spoke supports the respective turbine blade in the same manner. Therefore only on point of suspension will be described below. Thus in FIG. 2 a spoke 4 is shown in section with a turbine blade 6 suspended at its extreme end. In this exemplary suspension means, which is more clearly shown in FIG. 3, the turbine blade 6 has a protrusion 7 which extends into the open end of the spoke. A shaft 8 which is shown as a bolt with a head at one end and a stop at its other end, both recessed in the spoke, extends through the spoke and through a hole in the protrusion 7, the turbine blade thereby being pivotable around a vertical pivot axis CA. In the spoke 4 the shaft 8 is retained in reinforcing or stiffening parts 9 which like a fork grasp the protrusion 7.

Figure 3:
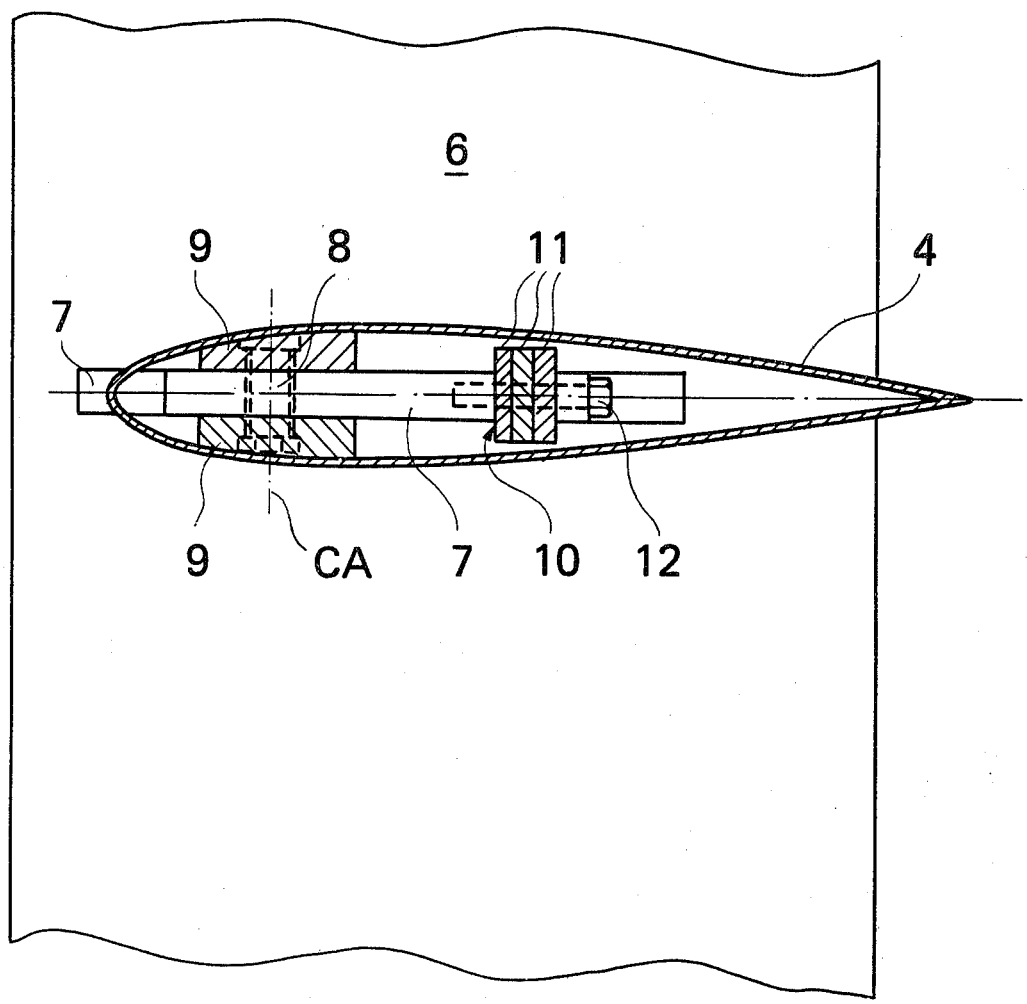
FIG. 3 is a sectional side view taken along the line III—III in FIG. 2, and shows the suspension of the turbine blade on the spokes.

In the spoke 4 spring means 10 in the shape of a spring bundle comprising at least one, and preferably several contiguous leaf springs 11 (FIG. 3 shows three leaf springs) is disposed between the turbine blade and the frame (turbine hub 3 in the shown embodiment) having one end firmly fixed in the protrusion 7 of the turbine blade, e.g. by means of a bolt 12 shown in FIG. 3, and having its other end disposed between the wall of the spoke and a shoulder 13 on the frame at the bottom of the spoke (here on the hub 3) in order to permit movement essentially only in the longitudinal direction of the spring bundle.

Figures 2, 4:
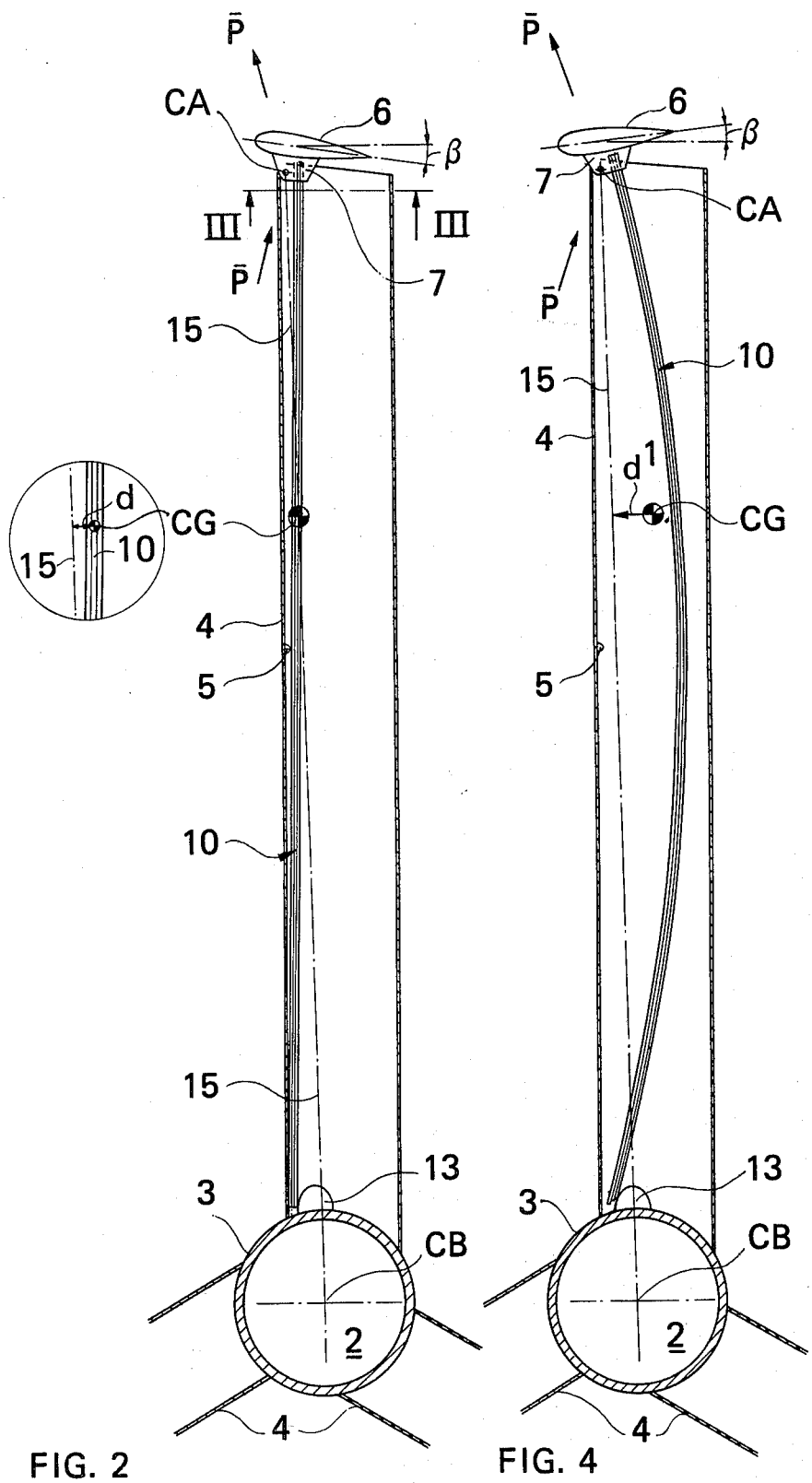
FIG. 2 is a sectional top view through a spoke and the turbine hub, showing a turbine blade in the initial position of the turbine at rest.
FIG. 4 is a view generally like FIG. 2 but showing the turbine blade readjusted at a high rotation speed.

In the disclosed embodiment the spring bundle 10 is unloaded and straight when the turbine is at rest. As FIG. 2 more clearly shows in the blow-up view the centre of gravity CG of the spring bundle 10 is located at a small distance d, which can be close to zero, from, and as seen in the direction of rotation of the turbine, behind a radial, imaginary plane 15 through the symmetry axis CB of the turbine shaft and the pivot axis CA of the turbine blade. This small distance d serves the purpose of a torque arm for the centrifugal force on the spring bundle caused by rotation of the turbine, for generating a torque which, acting around the pivot axis CA of the turbine blade, at increasing rotation speed readjusts the turbine blade under deflection of the spring bundle as shown in FIG. 4. At the inside of its forward wall portion the spoke 4 has a stop 5 which prevents deflection of the spring bundle the direction of rotation.

In the embodiment illustrated the individual leaf springs 11 composing the spring bundle have a triangular plan form as viewed from in front of the strut and have an even thickness as viewed from above the strut. Thus, each leaf spring has the shape of an equally sided triangle which has its base end 16 connected to the turbine blade while the opposite corner 17 abuts the shoulder 13. The cross-section of the spring thus increases from the turbine hub to the turbine blade. The triangular shape of the leaf spring results in two advantages. First, upon deflection of the leaf spring the stresses will be equally distributed over the length of the leaf spring with the accompanying saving of weight, at the same time as a maximum angular deformation is obtained at the end of the leaf spring. Secondly, the centre of gravity CG of the leaf spring will be located at a greater distance from the turbine shaft than would be the case for a rectangular leaf spring, and so the centrifugal force $F_C$ (FIG. 5) acting on the leaf spring bundle and which is proportional the radius of the centre of gravity CG from to the turbine symmetry axis CB, will have a larger value.

The mass of the turbine blade 6 is preferably (but not necessarily) small in relation to that of the spring bundle, and therefore the turbine blade preferably is a hollow profile. When the turbine blade has small mass, the effect of the centrifugal force emanating from the mass of the turbine blade on the readjustment of the turbine blade at rotation can be neglected, but in general the previously mentioned centre of gravity CG of the spring bundle 10 can be imagined to be valid for the combination of the spring bundle and the turbine blade which are connected to each other.

The spring bundle is dimensioned to exert at normal operation speed of the turbine a sufficiently large resistance to the centrifugal force $F_c$ (FIG. 5) to essentially oppose deflection of the spring bundle, and only an insignificant readjustment of the turbine blade is obtained.

The spring bundle is of such a dimension that the centrifugal force $F_c$ acting thereupon, which is proportional to rotation speed to the second power, at increasing rotation speed beyond normal operation rotation speeds bowingly deforms the spring elastically. As the spring is thus flexed, there is an increase in the distance d between the plane 15 (see FIG. 2A) and the center of gravity CG of the system comprising the spring and the blade. That distance d is the moment arm about which centrifugal force $F_c$ exerts a torque $F_c \times d$ whereby the spring is deflected as the blade is rotated about its pivot axis CA. Since the straightening force exerted by the spring must maintain equilibrium with the force that tends to deflect the spring, and the position of adjustment of the blade about its pivot axis CA is a function of spring deflection, the turbine blade is continuously and quickly readjusted with deflection of the spring bundle in a direction opposite to the direction of rotation, the free end of the spring bundle sliding against the shoulder 13.

When the rotation speed is again reduced, the centrifugal force $F_c$ acting on the spring bundle will decrease and so the spring bundle will return towards its initial state shown in FIG. 2 and in that connection readjust the turbine blade in the opposite direction.

The shoulder 13 has such a large extension in the radial direction that the spring bundle, at its maximum deflection in the strut, still has its free end abutting said shoulder. The side of said shoulder facing the spring bundle is curved in a circumferential direction, away from the leaf spring in order to facilitate tangential abutment between the shoulder and the spring bundle. This is preferred in order to secure restoration of the spring bundle after deflection.

In view of the fact that the end of the spring bundle during said deflection slides against said shoulder from the direction of rotation, the centre of gravity CG of the spring bundle is displaced further from said plane 15.

Even if the leaf spring bundle can be applied in different ways between the turbine blade and the turbine frame, the embodiment shown on the drawing is preferred since a long leaf spring bundle is desired. In the illustrated embodiment the leaf bundle 10 intersects the imaginary radial plane 15 through the symmetry axis CB of the turbine shaft and the pivot axis CA of the turbine blade. In this way a longer spring bundle can be disposed within the limited space of the strut, whereby a larger deflection of the spring bundle and consequently a larger deflection angle of the turbine blade is possible.

At the same time it is secured that the centre of gravity CG of the spring bundle will lie close to said plane 15. Thus, the spring bundle 10 is fixed to the turbine blade behind the pivot axis CA thereof, as seen in the direction of rotation, while at the hub the spring bundle end is disposed in front of said plane 15 between the forward wall portion of the spoke and the shoulder 13.

In a non-disclosed embodiment having slender struts requiring the use of a single slender leaf spring therein, the leaf spring may be biased to form at the turbine blade end an angle of a few degrees preferably 3° or 4°, to said plane 15. Biasing of the leaf spring secures a correct deflection of the spring and prevents vibrations of the spring. The desired biasing angle is achieved by means of an insert having adjacent to the blade end of the spring an abutting face against which the spring bears. By providing a centre plate on the hub and placing the centre end of the spring at a distance from and forwardly of the symmetry axis CB the length of the spring can exceed a radius to its extreme fixation point.

Figure 5:
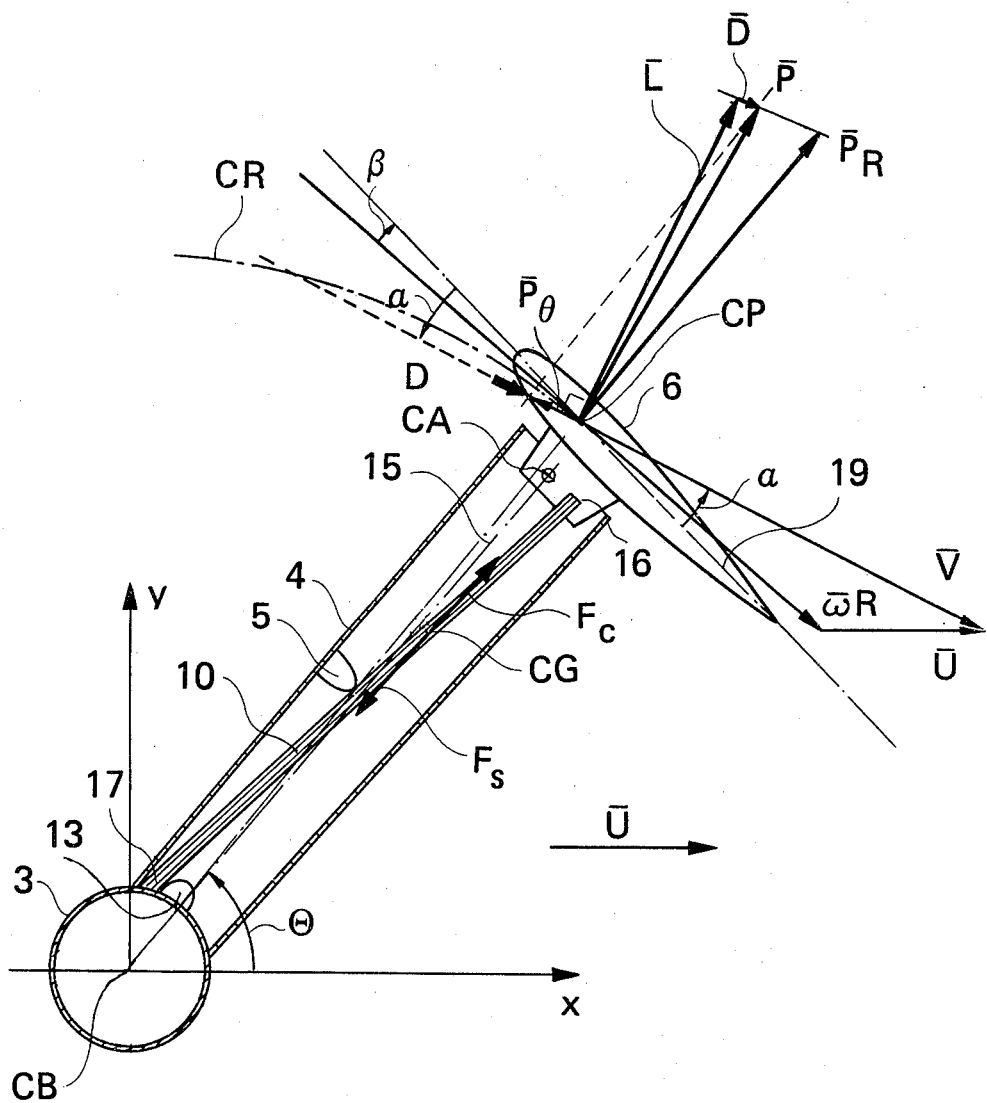
FIG. 5 is a schematic sectional view not to scale showing the forces acting on a turbine blade.

FIG. 5 is a view of the same kind of FIGS. 2 and 4 but not to scale and schematically shows a turbine blade 6 in an instantaneous position of rotation having an angle $\theta$ in a coordinate system XY during the rotation of the turbine at normal operational rotation speed. The direction of the wind is parallel to the X-axis. Apart from interferences induced by the wind turbine itself, the wind forces acting on the turbine blade are shown as well as the action of forces in the spring bundle.

The turbine blade 6 is, by means of the spring bundle 10, adjusted in order to form at the state of rest of the turbine, and consequently at normal operation rotation speed, a chord angle $\beta$ outwards from the tangent to the revolution circle CR through the aerodynamic centre CP of the turbine blade in which centre the resultant of the wind forces is supposed to attack. The angle $\beta$ is chosen to be approximately 2°, since this value for a symmetrical profile has proved to result in the best torque curve for the wind forces illustrated as $\overline{P}_\theta$, as seen during a revolution, and acting on the turbine blade and driving the turbine.

FIG. 5 also shows how the strength of relative wind $\overline{V}$ is obtained as the resultant of the wind velocity $\overline{U}$ and the peripheral velocity $\overline{wR}$ of the turbine blade, where w is the angular speed and R is the radius to the aerodynamic centre CP. The strength of relative wind $\overline{V}$ forms an angle of attack $\alpha$ to the chord 19 of the turbine blade, which chord has a length c. The wind disturbances caused by the presence and the rotation of the wind turbine, which disturbances can be of a significant size and result in local changes of the wind velocity $\overline{U}$ both as to size and direction, have not been shown since they are not required for the description of the invention.

The wind force $\overline{L}$, termed aerodynamic lift in connection with wing profiles, and acting on the profile during rotation of the turbine, attacks in the aerodynamic centre CP and acts perpendicularly against the strength of relative wind $\overline{V}$. By adding the braking wind force $\overline{D}$ which acts in the direction of the relative wind the overall wind force resultant $\overline{P}$ acting on the turbine blade is obtained, said resultant being shown resolved into the tangent component $\overline{P}_\theta$ which causes the rotation of the turbine, and a radial component $\overline{P}_R$ which does not influence the rotation.

It is realized that the power resultant $\overline{P}$ acting outwards in FIG. 5 during the rotation of the turbine blade around the turbine shaft will undergo changes both as to its magnitude and its direction. Moreover, the aerodynamic centre CP of the turbine blade varies somewhat around a point at the distance of 0.25. c counted from the forward edge of the turbine blade, in response of the angle of attack $\alpha$.

An essential feature of the invention is that the pivot axis CA of the turbine blade has such a location that the mean value of the wind force resultant $\overline{P}$ over a revolution has a direction substantially through the pivot axis CA of the turbine blade 6, the influence of the wind forces on the readjustment of the turbine blade thereby being reduced to a minimum. In FIG. 5 the resultant $\overline{P}$ of the wind forces is shown directed through the pivot axis CA, thereby not producing any torque that acts upon the turbine blade around its pivot axis CA. To this end the pivot axis CA is, for the shown symmetrical profile, located at a distance of 0.3. c from the forward edge of the turbine blade as seen parallel to chord 19. In FIGS. 2 and 4 two extreme directions are shown for the resultant $\overline{P}$ of the wind forces during a revolution of the turbine.

When the wind turbine provided with means according to the invention for limiting the rotation speed is rotated, the wind forces will to a very little extent effect the adjustment of the turbine blade which instead is dependent of the centrifugal force $F_C$ acting on the flexible system comprising the spring bundle 10 and the blade connected with it.

At an increasing rotation speed beyond normal operation rotation speed the chord angle $\beta$ will, as has been previously mentioned, gradually be decreased towards zero with deflection of the spring bundle, and upon further increase in speed the angle will reach zero and then take greater and greater negative values. This change of the chord angle $\beta$ results in a decreasing power coefficient for the turbine and, provided the wind force is unchanged, would mean that the driving torque decreases. Since the reduction of the chord angle is obtained as a result of an increasing wind strength and as a consequence thereof greater wind forces, the rotation speed will at moderate wind speeds, in spite of the decreasing power coefficient, be maintained almost constant at operation rotation speed. If the rotation speed, in spite of the fact that the chord angle $\beta$ of the turbine blade has been decreased, continues to grow, the result of the continued blade readjustment is that at a determined rotation speed the power coefficient will be negative, i.e. the turbine is subjected to braking, which takes place approximately when the chord angle reaches a value below $-6°$.

Said means according to the invention is preferably constructed with an operational interval for readjustment of the chord angle of the turbine blade to at least the order of magnitude of 10°, a large braking torque being obtainable thereby. This is often necessary for a vertical shaft turbine which is placed without any surveillance. Vertical shaft turbines are not selfstarting. In case electric power, e.g. from a battery which is rechargable by means of a generator connected to the turbine, cannot be employed for starting the turbine there is required e.g. a Savonius Turbine mounted on the hub, which turbine has shovel shaped blades. A Savonius turbine is self-starting but gives little contribution to the driving torque at normal operation rotation speed. However, at rotation speeds beyond normal operation speed the Savonius turbine again will give a significant drive torque that is superimposed upon the torque from the wind turbine. In order to eliminate this torque the vertical shaft turbine must generate a braking torque at larger rotation speeds. According to the invention this braking torque is achieved in that the turbine blades are readjusted to take more and more negative chord angles.

In the addition to the above mentioned advantages of said means for limiting rotation speed it should be mentioned that the effect of the small variations, inevitable at the operation of the turbine, of the wind force $\bar{P}$ on the turbine blade as a result of gusts and the turning of the wind force resultant $\bar{P}$ over the pivot axis of the turbine blade, is counteracted by movement between the individual leaf springs of the spring bundle.

Said means according to the invention can be modified in several respects. Thus, the spring bundle may contain an arbitrary number of leaf springs. Moreover, the suspension of the turbine blade on the struts of which more than two may be connected to each turbine blade, can be made in another way.

I claim:

1. A wind turbine comprising a central support rotatable about a vertical turbine axis, a plurality of struts rigidly connected with said support and projecting outwardly therefrom substantially radially to said turbine axis, said struts being arranged in sets, there being at least two struts in each set that are vertically spaced apart and have their outer ends vertically aligned, and the struts of the several sets being at uniform angles to one another around said turbine axis, and a plurality of airfoil section blades, one for each set of struts, each blade having pivot connections to the outer ends of the struts of its set and having vertical leading and trailing edges, said wind turbine being characterized by:

A. said pivot connections for each blade having a common pivot axis which is
   (1) contained in a plane that also contains the turbine axis,
   (2) is near the blade but at the side thereof that is adjacent to the turbine axis, and
   (3) is substantially near a point through which extends the resultant of the mean wind forces acting on the blade through its orbit, so that aerodynamic forces have little tendency to swing the blade about said pivot axis; and B. a plurality of elongated leaf springs, one for each blade, each extending lengthwise between its blade and a zone near the turbine axis to have inner and outer ends, and each
   (1) having at its outer end a rigid connection with its blade and
   (2) having at its inner end a connection with said central support whereby the inner end portion of the leaf spring is substantially confined against lateral motion but is substantially free for lengthwise motion, said connections so orienting the leaf spring that the center of gravity of the system comprising the leaf spring and its blade is at all times spaced behind said plane so that centrifugal force acts to flex the leaf spring and swing the trailing edge of the blade outwardly about its pivot axis.

2. The wind turbine of claim 1, further characterized by:
   each said leaf spring comprising a plurality of substantially flat leaf spring elements that are substantially identical and flatwise adjacent to one another.

3. The wind turbine of claim 1 wherein each said leaf spring has a width dimension that extends substantially parallel to said axes and decreases in width substantially uniformly along its length from its outer end.

4. The wind turbine of claim 1, further characterized by
   (1) each of said struts being hollow, and
   (2) each leaf spring extending lengthwise through a strut.

5. The wind turbine of claim 3, further characterized by:
   (3) abutment means in each strut, spaced from said turbine axis and said pivot axis and whereby the leaf spring that extends through the strut is engaged at the side thereof that faces forwardly during normal turbine rotation, for preload flexing bias.

6. The wind turbine of claim 1 wherein each of said blades has a symmetrical airfoil section.

7. The wind turbine of claim 6 wherein each of said blades is of hollow construction.

* * * * *